No. 610,766. Patented Sept. 13, 1898.
G. G. S. MERRY.
COIN CONTROLLED WEIGHING SCALE AND GRIP AND LIFTING MACHINE.
(Application filed Jan. 12, 1898.)

(No Model.) 5 Sheets—Sheet 1.

WITNESSES.
Matthew M. Blunt
C. M. Wilbur

INVENTOR.
George G. S. Merry.
By O. M. Shaw
ATT'Y

No. 610,766. Patented Sept. 13, 1898.
G. G. S. MERRY.
COIN CONTROLLED WEIGHING SCALE AND GRIP AND LIFTING MACHINE.
(Application filed Jan. 12, 1898.)

(No Model.) 5 Sheets—Sheet 2.

WITNESSES.
Matthew M. Blunt.
C. M. Wilbur

INVENTOR
George G. S. Merry,
By O. M. Shaw
ATT'Y

No. 610,766. Patented Sept. 13, 1898.
G. G. S. MERRY.
COIN CONTROLLED WEIGHING SCALE AND GRIP AND LIFTING MACHINE.
(Application filed Jan. 12, 1898.)
(No Model.) 5 Sheets—Sheet 3.

WITNESSES. INVENTOR.
Matthew M. Blunt. George G. S. Merry,
C. M. Wilbur. By O. M. Shaw.
ATT'Y No. 610,766. Patented Sept. 13, 1898.
G. G. S. MERRY.
COIN CONTROLLED WEIGHING SCALE AND GRIP AND LIFTING MACHINE.
(Application filed Jan. 12, 1898.)
(No Model.) 5 Sheets—Sheet 4.

WITNESSES
INVENTOR.
ATT'Y

No. 610,766. Patented Sept. 13, 1898.
G. G. S. MERRY.
COIN CONTROLLED WEIGHING SCALE AND GRIP AND LIFTING MACHINE.
(Application filed Jan. 12, 1898.)
(No Model.) 5 Sheets—Sheet 5.

WITNESSES.
Matthew M. Blunt
C. M. Wilbur

INVENTOR.
George G. S. Merry,
By O. M. Shaw,
ATT'Y.

UNITED STATES PATENT OFFICE.

GEORGE G. S. MERRY, OF BOSTON, MASSACHUSETTS, ASSIGNOR TO THE AUTOMATIC WEIGHING, LIFTING AND GRIP MACHINE COMPANY, OF PORTLAND, MAINE.

COIN-CONTROLLED WEIGHING-SCALE AND GRIP AND LIFTING MACHINE.

SPECIFICATION forming part of Letters Patent No. 610,766, dated September 13, 1898.

Application filed January 12, 1898. Serial No. 666,411. (No model.)

*To all whom it may concern:*

Be it known that I, GEORGE G. S. MERRY, of Boston, in the county of Suffolk and Commonwealth of Massachusetts, have invented certain new and useful Improvements in a Combined Coin-Controlled Weighing-Scale and Grip and Lifting Machine, of which the following is a description sufficiently full, clear, and exact to enable any person skilled in the art or science to which said invention appertains to make and use the same, reference being had to the accompanying drawings, forming a part of this specification, in which—

Figures 1, 2, 3, 4:
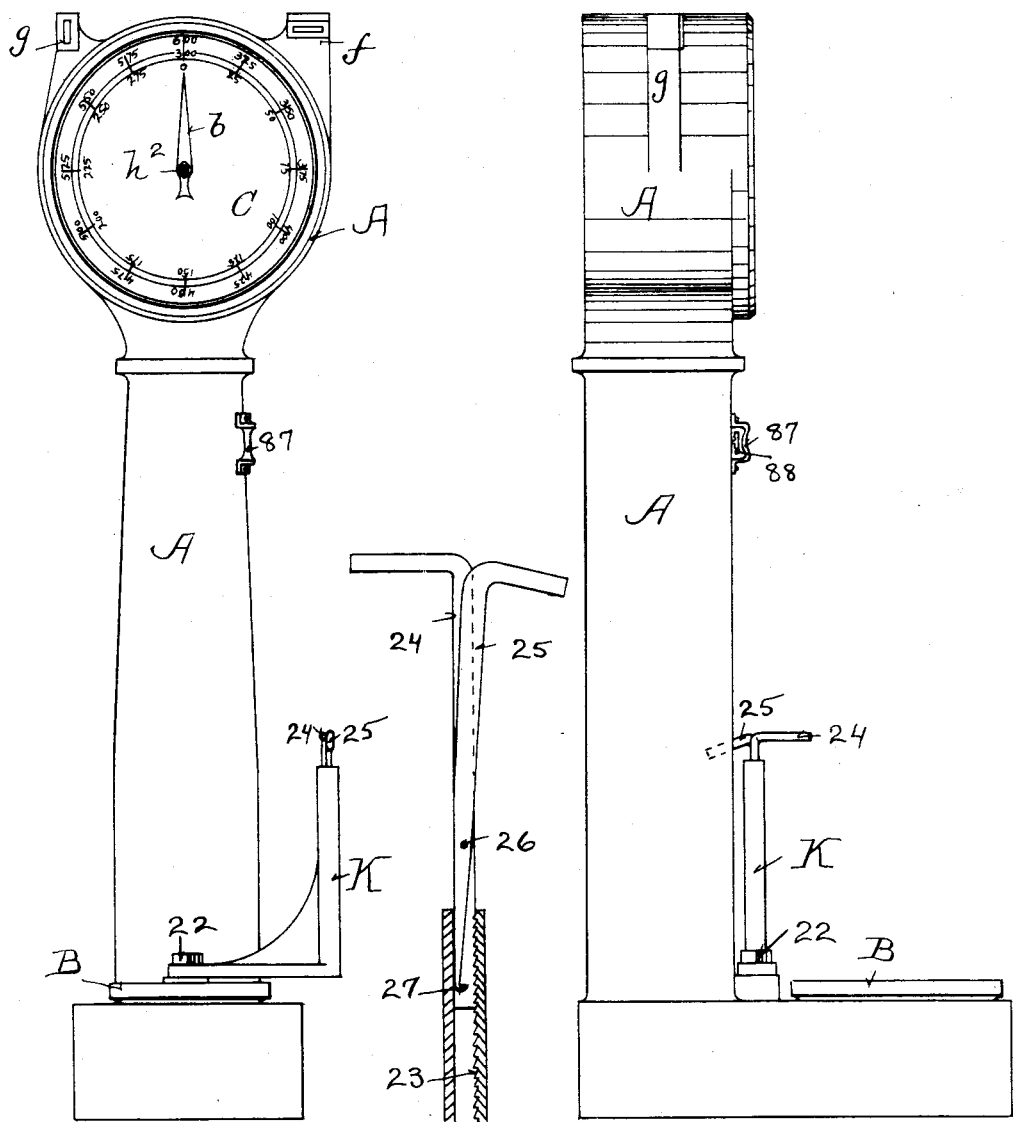
Figure 5:
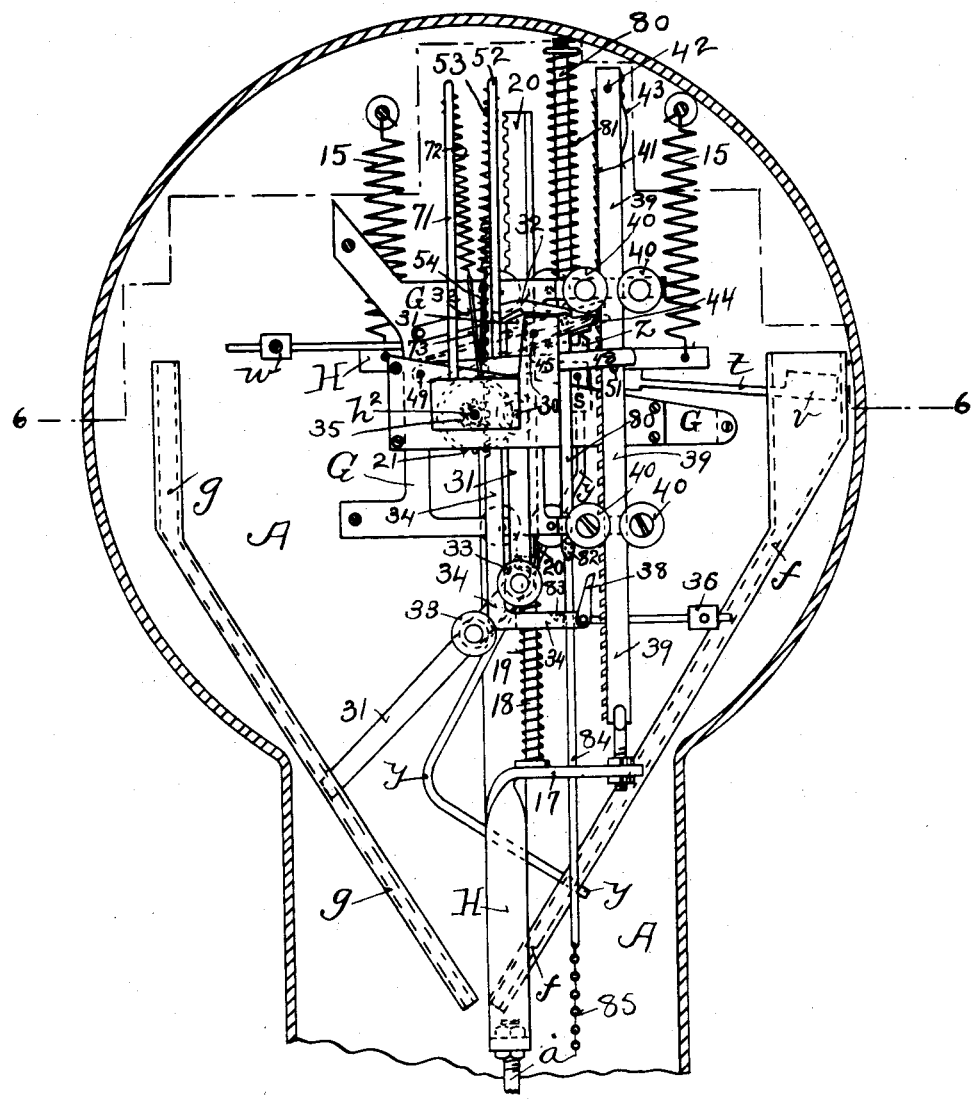
Figure 6:
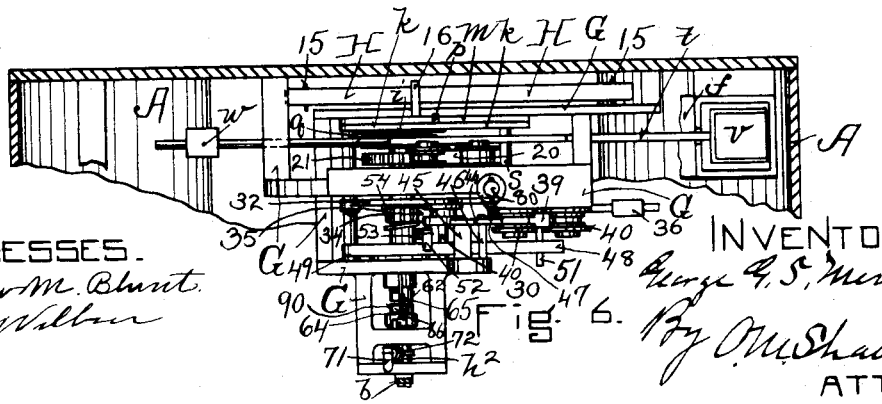
Figure 7:
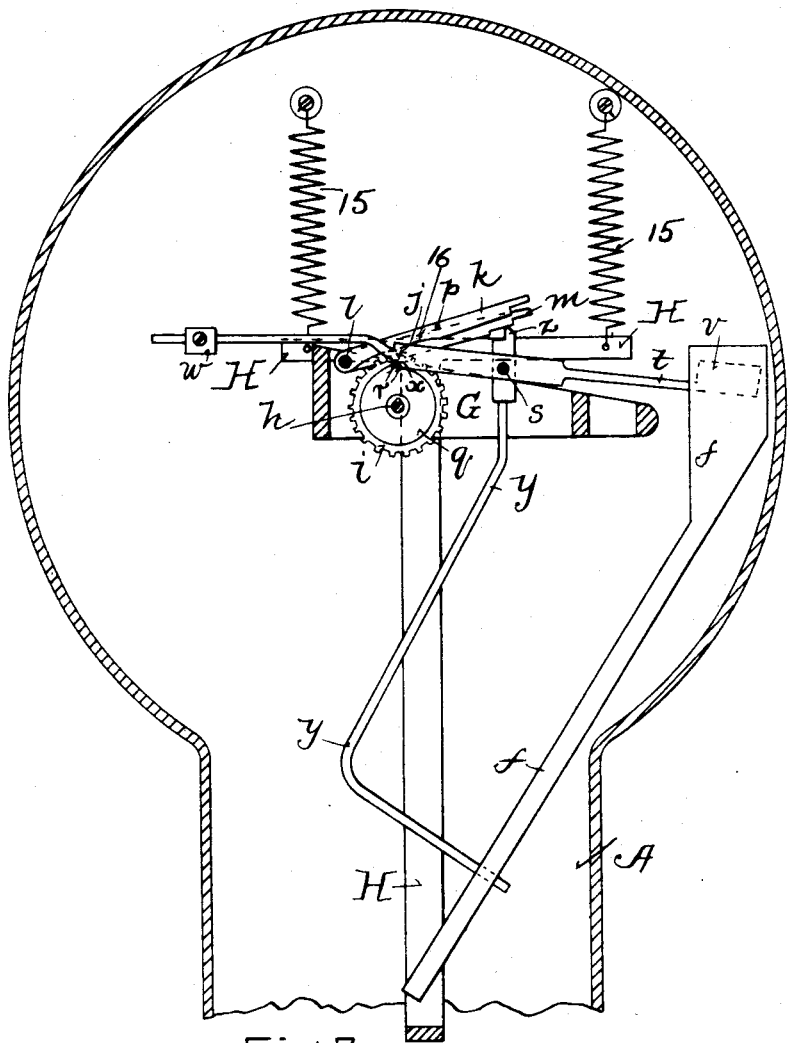
Figure 8:
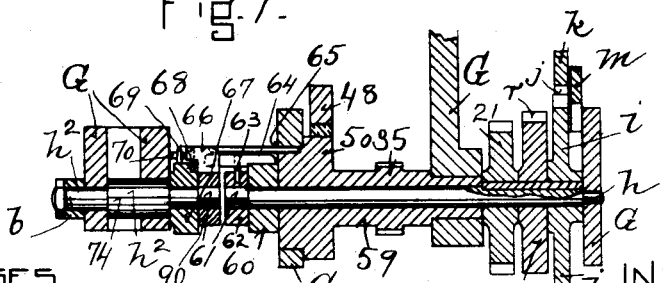
Figures 9, 10:
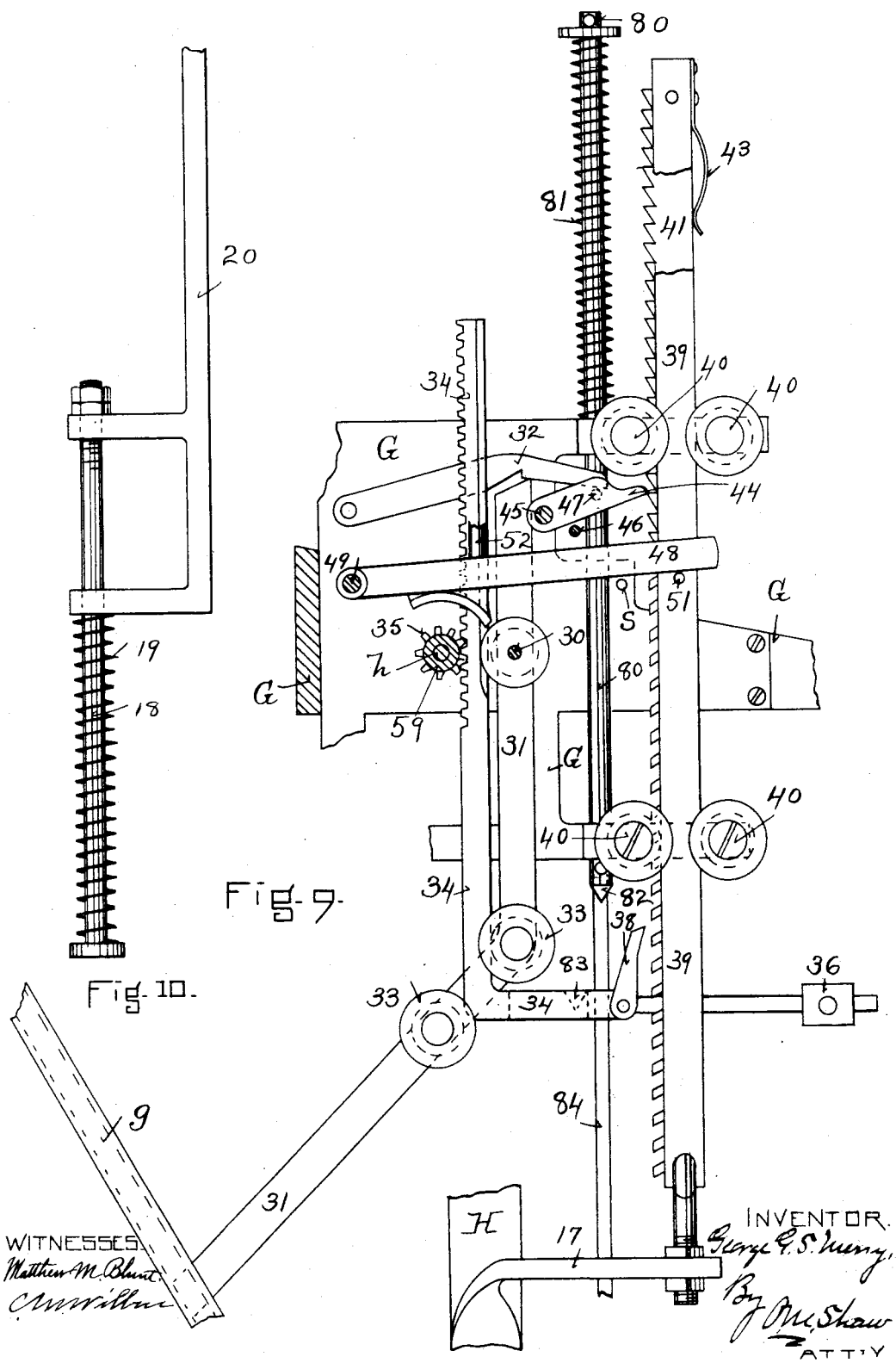
Figure 11:
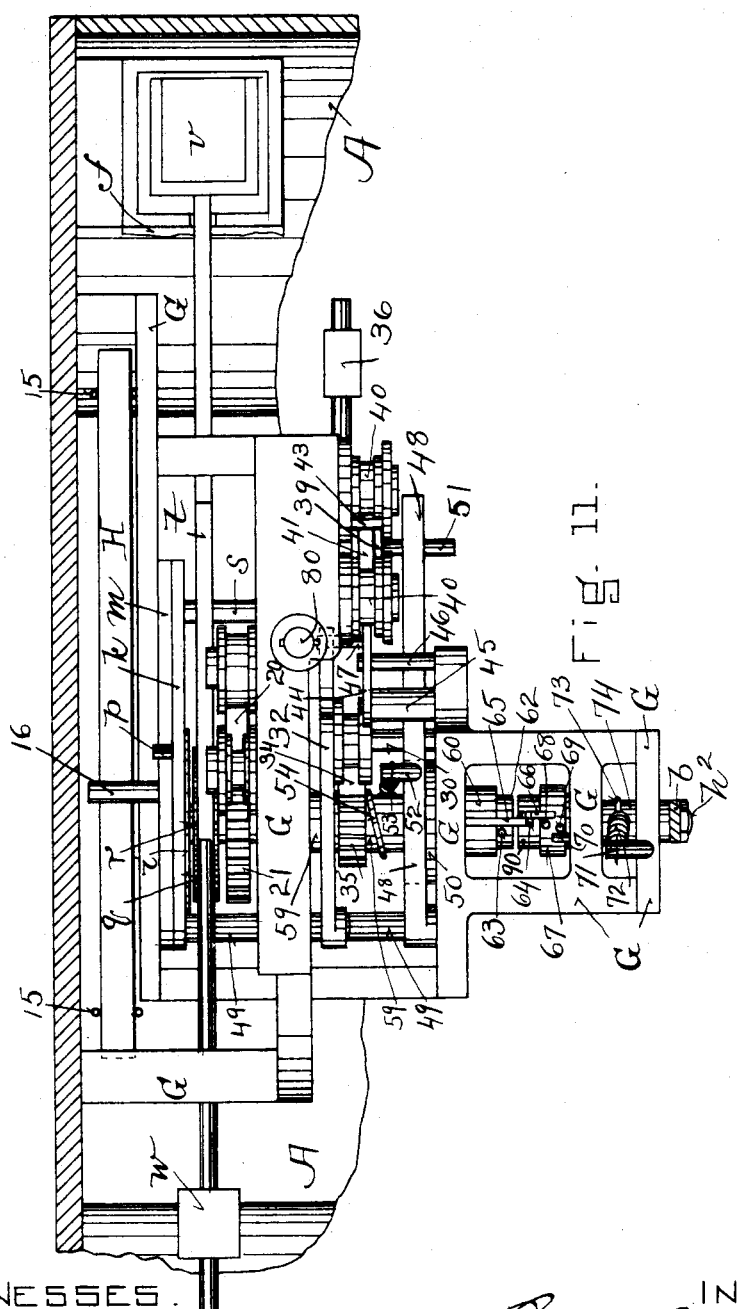

Figure 1 is a front elevation of my improved combination-machine. Fig. 2 is a side elevation of the same; Fig. 3, an elevation, partly in section, enlarged, showing the lifting-handles and socket; Fig. 4, a similar view, enlarged, of the grip and continuous mechanism; Fig. 5, a front elevation, enlarged, of the operating mechanism, the head of the case being in vertical section; Fig. 6, a top plan view of said mechanism, taken on line 6 6 in Fig. 5; Fig. 7, a view similar to that in Fig. 5, illustrating the weighing mechanism primarily, the conjunctive mechanism being removed; Fig. 8, a horizontal section, enlarged, showing a compensating device for the lifting mechanism; Fig. 9, an elevation, enlarged, of the details pertaining to the lifting mechanism; Fig. 10, a side elevation of the power end of the gravity-rack; and Fig. 11, a plan view, enlarged, like that shown in Fig. 6.

Like letters and numerals of reference indicate corresponding parts in the different figures of the drawings.

My invention relates especially to a coin-released weighing-scale mechanism and devices in combination therewith whereby in the same scale-case and with the same dial or index grip and lifting strength tests may be made and registered, these last two functions being accomplished by a mechanism released by a coin from a single chute, and said mechanism operating in turn portions of the weighing mechanism sufficiently to indicate the gripping and lifting power in pounds. Each of the devices may be operated independently, yet the weighing mechanism is the base for the operation of the others.

The object of the invention is, while providing a simpler and far cheaper coin-operated weighing mechanism than many now in use, to produce a mechanical combination therewith by the addition of comparatively simpler movements and impart the additional functions of lifting and gripping.

The nature and operation of the device will be understood by those conversant with the analogous art from the following explanation.

In the drawings, A represents the case of the machine, which is of the general shape usual in devices of this class and has the platform B mounted on the ordinary tilting beam, (not shown,) which connects with the index mechanism by adjustable rod $a$, (see Fig. 5,) as is customary in all machines of this grade.

On the face of the head of the case there is the circular dial C, so spaced and numbered that the needle $b$ may make two revolutions and indicate, the purpose of this being, as hereinafter described, to register for the combined weight of the operator and his lifting strength.

On one side of the case-head there is a coin-chute $f$ for receiving a coin, whereby the weighing mechanism alone of the machine is released. At the opposite side there is a similar chute $g$, into which coins are inserted when either the lifting or the grip testing devices are to be actuated. Interiorly of the case-head there is a frame G, of suitable form to support the operating mechanism.

In Fig. 7 the main portions of the weighing mechanism proper are shown. There is a sectional shaft $h$ $h^2$ (see Fig. 8) journaled in the frame and case, its outer section $h^2$ carrying the index-finger $b$. Fast on the section $h$ of this shaft there is a ratchet-wheel $i$, which is held against rotation, and thereby locking said shaft, by means of the tooth $j$ on a gravity-pawl $k$, pivoted at $l$ to the frame. There is a second lever $m$ loose on said pivot and parallel with the pawl $k$, a pin $p$ on said pawl resting on the lever $m$, which is a stop-lever, for purposes hereinafter specified. The pawl $k$ and lever $m$ are notched at their free ends.

In front of the ratchet $i$ on shaft-section $h$ there is a wheel $q$, with two teeth $r$ only in its rim or periphery. On the pivot $s$ in the frame a lever $t$ is mounted to rock. This lever has at one end a pan $v$ in the path of a coin in the chute $f$, the opposite end of said lever being counterbalanced at $w$. This lever has a tooth $x$, which will engage with one of the indentations $r$ on wheel $q$ and lock the shaft normally. The indentations are so provided that if one does not engage with locking-lever the other will. On the same pivot $s$ an angle-lever $y$ swings, its upper end being provided with a latch-head $z$, which may engage the locking-pawl $k$ and its companion lever $m$. The lower end of said latch-lever $z$ projects across the coin-path in the chute $f$ below the pan $v$.

The rod $a$, connecting with the scale-platform, as described, joins a T-bar H, fitted to slide vertically in the case, the arms of said bar being supported by two springs 15 of known tension. There is a pin 16 (see Fig. 6) projecting laterally from the locking-lever $m$ and normally resting on the head of bar H, whereby the teeth of the lever $k$, from which pin $p$ projects over lever $m$, are kept out of engagement with the ratchet-wheel $i$. From the shank of the T-bar H projects a horizontal arm 17, (see Fig. 5,) and the lower end of a vertically-sliding rod 18 rests thereon. Said rod is tensioned by a coiled spring 19 and slips loosely in the lower end of a rack-bar 20. This bar meshes with a pinion 21, fast on the shaft-section $h$ in front of smooth wheel $r$. When the scale-platform is depressed and the arm 17 thereby lowered, said rack-bar carrying the spring-tensioned rod 18 is fitted to fall by gravity if the shaft-locking mechanism is released.

The operation of the mechanism so far described, which constitutes the weighing portion thereof, is as follows: Weight being applied to the scale-platform B, the T-bar H is drawn downward in opposition to the springs 15. The pawl $k$ is thus released, but is held from engaging ratchet $i$ by latch-head $z$ of angle-lever $y$, which, as shown in Fig. 7, contacts with and supports the second lever $m$. A coin being inserted in chute $f$ strikes pan $v$, tilting lever $t$ and disengaging its tooth $x$ from wheel $q$. This releases shaft-section $h$ and the weighted rack-bar 20 falls until the lower end of rod 18 reaches the arm 17. This movement rotates shaft $h$ $h^2$ and carries the finger $b$, proportionately indicating the amount weighed in the ordinary manner of spring-scales. As the coin continues to drop down through chute $f$ it strikes lever $y$, throwing its latch-head $z$ outward, permitting lever $m$ to fall until said head $z$ engages in the notch at the outer end of said lever. This allows pawl $k$ to drop, engaging ratchet $i$, locking the shaft, and holding the index at the point assumed. So should a heavier weight be added to the platform its amount could not be ascertained, because although the T-bar would descend the rack 20 would not fall, as the shaft is locked. Nor if a lighter weight were substituted would it affect it as the rod 18 would slip upward on the rack, compressing spring 19 as the T-bar ascended. When the T-bar should thus ascend or be quickly returned by its springs 15 when weight was entirely removed from the platform B, its head engages the pin 16, which projects from lever $m$, and disengages pawl $k$ from the ratchet $i$, freeing the shaft. Immediately the recovery of the spring 19, compressed by the upward passage of T-bar and slipping rod 18 on arm 17, would throw rack-bar 20 upward, rotating shaft $h$ $h^2$ and returning index $b$ to the zero-point. Simultaneously the counterbalance $w$ on the chute-lever will engage its tooth $x$ in wheel $q$ and lock said shaft until another coin is inserted.

On account of the shape and position of lever $y$ and its consequent quick return after a coin has passed it were the pawl $k$ alone used it would bear frictionally against said pawl and prevent its dropping should the tooth of the pawl accidentally rest on the square end of one of the teeth of the wheel $i$. By employing the secondary lever $m$, which the head $z$ engages on its return, said head is held out of contact with the pawl, which thus has room to drop, as wheel $i$ rotates sufficiently to carry it off the end of the wheel-tooth. Thus the interposition of lever $m$ renders the locking of the pawl positive, as it would not be were the head $z$ to contact directly with it.

The fundamental principle of the device is as described, both the grip and lifting devices operating to a degree this same mechanism. Their construction is as follows:

On the base of the case A, at the rear of the platform B, a right-angle frame K is pivoted by one arm at 22 to swing horizontally. The vertical arm of this frame is tubular (see Fig. 3) and interiorly one wall thereof is provided with a ratchet-bar 23. Fitted to slide vertically in said arm there are two levers 24 and 25, pivotally connected at 26, their upper ends being offset to form handles. The lever 24 slides snugly in the frame-arm and is employed, primarily, to adjust the height of the handles to the convenience of the user standing on the scale-platform B, the swinging frame K also being adapted to adjustment for this purpose. The lever 25 has a tooth 27 at its inner end for engaging the ratchet 23, so that when after adjustment at proper height both handles are grasped by the operator and lifting power applied the tooth 27 will be swung into the ratchet and prevent the levers being withdrawn from the frame. As the operator thus exerts lifting power and the frame K being immovable vertically a corresponding power is exerted downward on the scale-platform in addition to the weight of the occupant. The mechanism for releasing the weighing and lift-recording mechanism is operated from a coin disposed in the second chute $g$. An angle-bar 31 (see Fig. 9) is pivoted to swing in the frame G at 30 and has its lower end projecting across the path of the coin in said chute $g$. Over the upper end of said bar 31 a pivoted latch 32 is arranged to fall and lock it against movement in one direction. On the bar 31 there are two guide-rolls 33, between which a right-angle rack-bar 34 is fitted to slide vertically and is carried by the first bar 31. These rolls are disposed one at the angle of the bar 31 and the other in a lower horizontal plane, as shown in Fig. 9, and engage rack-bar 34 on opposite edges, respectively. The rack-teeth are on the vertical arm of bar 34 and mesh with a pinion 35 (see Fig. 8) on shaft-section $h$. The horizontal arm of rack-bar 34 is provided with a counterbalance 36 (see Fig. 5) sufficient to return swinging bar 31 after having been moved by impact of the coin. On this horizontal arm also there is pivoted a pallet 38 in position to secure a ratchet 39 when the pivoted bar 31 has been swung from left to right by a coin in chute $g$. This vertical ratchet 39 has its lower end fast to and is carried by the main weighing T-bar H and passes upward between guide-rolls 40 on the frame G.

In the upper end of the bar 39 is pivoted a ratchet 41 at 42, its teeth being turned in direction opposite to those on said bar 39. This ratchet 41 is tensioned by a spring 43 and is thus held in contact with the toe of pawl 44, pivoted at 45 in the frame G. The spring permits said pawl being stopped against descent by a pin 46 in frame. On the upper course of bar 39 a pin 47, projecting rearwardly from the pawl, will engage the toe of latch 32 (see Fig. 9) and elevate it to unlock the upper end of swinging bar 31, it being understood that ratchet 41 elevates said pawl 44 as it moves upward.

There is a friction stop or brake for the shaft, which comprises a lever 48, pivoted at 49 in the frame and engaging a boss 50 on the shaft-section $h$. (See Fig. 8.) The outer or free end of this brake projects into the path of a pin 51 on the ratchet-bar 39, so that when said bar ascends it will disengage the brake from the shaft. Carried on the brake 48 there is a vertical arm 52, from the upper end of which is pendent a spiral spring 53. A cord 54 on the lower end of this spring winds on the shaft $h$ between gear 35 and boss 50. Tension is thus applied to brake, which at a determined point is sufficient to hold shaft against rotation until shaft is released by movement of bar 39. The gear 35 and the boss 50 are on the same hub or sleeve 59, which is loose on the shaft-section $h$.

Before describing the operation specifically of the lifting mechanism a description of the shaft-sections and continuous parts is essential.

In front of the sleeve 59, Fig. 8, there is a loose ring 60 on section $h$, and the ends of said sections $h$ $h^2$, which are in alinement, are squared at 61. On the square of section $h$ there is a fast collar 62, from which a pin 63 radiates. Splined into the loose ring 60 there is a fin 64, which pin 63 engages as shaft is rotated. A horizontal finger 65 projects from the sleeve 59, said finger 65 and fin 64 overlapping a fast collar 90 on the shaft-section $h^2$ in position to engage a like fin 66, which is splined into said collar 90 on shaft-section $h^2$. A pin 60 radiates from loose ring 67 behind pin 66 as viewed in Fig. 8. Another pin 69 also radiates from this ring and engaging a stop 70 on the adjacent portion of the frame acts as a stop to limit the return of the shaft and stop the index at zero-point on its return. The purpose of this connecting mechanism between the shaft-sections is that the pressure of the lifting added to the weight of the operator would require more than one revolution of the needle $b$ to indicate it on the dial, which is ordinarily spaced to show three hundred pounds. So when shaft-section $h$ has made a complete revolution, carrying with it section $h^2$, the strain of the lift, further carrying sleeve 59, would cause its finger 65, engaging fin 66, to contact said fin with pin 68 on the side opposite that shown and by means of fast collar continue the rotation of front shaft-section $h^2$, the loose ring 67 being carried with it on this last revolution.

On the frame G there is a standard 71, (in Fig. 5,) from which spring 72 is pendent, and connected by a cord with shaft-section $h^2$ winds on barrel 74, Fig. 8, on said section. When the parts are released, this spring returns the shaft until stops 69 and 70 engage, at which point the index is at zero.

Normally the lifting-frame K is swung at one side, as in Fig. 1. When in use, it is turned to any position convenient to the person standing on the platform B. The handle-levers are then adjusted to the proper height, as already described.

The weight of the person applied at the platform draws the T-bar H down in the same manner as described for the first movement in the weighing and without moving any of the registering mechanism, as said rack 39 plays free in its guides. A coin dropped into chute $g$ engages the end of lever 31, rocking it from left to right as viewed. This throws its upper end in the opposite direction and permits the latch 32 to fall and lock it against return by the counterbalance 36. As the strength of the operator is applied to lifting-handles 24 and 25, which are immovable vertically, the force results in further depression of the platform B in the same manner as if additional weight were applied. This draws the T-bar H, and with it the rack 39, still farther down; but now said rack engages pallet 38, and thus drives in like direction the angle-rack 34, which, meshed with pinion 35, operates the index-shaft correspondingly and registers the amount in pounds of the lift with an accuracy which is not attainable in many ordinary coin-released lifting-machines, as it is not measured direct by the known spring-scale, as in my device. The shaft rotating thus winds up the cord 54, distending spring 53, the tension of which exerted on standard 52 applies brake 48 to said shaft. The friction of this brake is just sufficient to prevent return of shaft by spring 72 when the lifting-handles are released suddenly by user, and the needle or index is thus held at the point registered. Now when the weight is removed from the platform B the scale-springs 15 act at once to elevate the T-bar H, carrying with it the rack-bar 39. The spring-tensioned rack 41 thereon, engaging pawl 44, carries it upward on its pivot 45, and the pin 47 on said pawl, engaging the free end of the latch 32, lifts it and frees the upper end of the rocking angle-bar 31. The counterbalance 36 now acts and returns said bar to its normal position with its end projecting into chute $g$. Consecutively in the upward passage of the ratchet-bar 39 the pin 51 thereon engages the free end of the brake 48, lifts it, and frees the index-shaft $h$ from its tension, said shaft being immediately returned by the pull of spring 72 and finger $b$ returned to zero in the same manner described for the weighing. Of course the return rotation of the shaft elevates the rack-bar 34 to its normal position on its carriage, whereon it slides freely even when said bar or carriage has swung back.

The grip-testing device comprises a rod 80, (see Fig. 9,) fitted to slide vertically in the frame G and tensioned against downward movement by a spring 81. This rod has a point or step 82 at its lower end, which may be engaged in a suitable notch 83, projecting from the inner face of the horizontal part of the right-angle rack-bar 34, said notch being so arranged that it will be thrown into the path of the rod 80 when the carriage-bar 31 is moved by the impact of a coin, as already described. At all other times the rod 80 plays freely behind bar 34. This rod 80 has an offset extension 84 pendent from it rigidly, to the lower end of which a chain or cord 85, Fig. 5, is attached and passes over a pulley 86, Fig. 4, journaled in the case. On the outside of the case A there is a handle 87, and within said handle a T-shaped finger-grip 88 of the usual arrangement is disposed. The shank of this grip slides in the case-wall, and its inner end is connected to the chain 85. A spring 89 tensions this grip against outward pull. (See Fig. 4.) In use until a coin is disposed in the chute $g$ the T-grip 88 may be moved at will, the rod 80 responding, but the index not being affected. When a coin is inserted in said chute, the carrier-bar 31 is rocked and the conjunctive mechanism operated in precisely the same manner as described for the lifting mechanism. Now when the grip-lever 88 is drawn outward the step 82 on rod 80, engaging in notch 83 on rack-bar 31, draws down or actuates said rack-bar 31 to operate the index. Of course the user, standing on the platform, has distended the scale-springs 15, by which the parts will be returned, as above described, when the weight is removed, and the springs 81 and 89 will return the direct grip mechanism to its normal position.

It will be seen that in my improvement I provide a simple and accurate coin-released spring-scale mechanism, a lifting mechanism, and a grip-testing device all in the same machine, wherein each succeeding mechanism is dependent in some degree upon at least a portion of the preceding and wherein the results of each specific device may be indicated upon the same dial with a common index-finger, and as only one platform is employed the necessity of leaving said platform to effect any of the functions is obviated. The combinations of elements shown and described, which relate generally and specifically to dynamometers and scales other than as coin-controlled mechanism, I purpose making the subject-matter of another application for Letters Patent, for which reason I have not herein claimed the same.

Having thus explained my invention, what I claim is—

1. In a coin-operated weighing-scale, a rotary index-shaft, a coin-released locking mechanism therefor, and a second locking mechanism operated subsequently by the action of the same coin, substantially as specified.

2. In a coin-operated weighing-scale, the combination of a spring-scale balance; a rotary index-shaft, a gravity device for actuating said shaft, the movement of which is determined by said scale mechanism, and a spring for returning said gravity mechanism.

3. In a coin-operated weighing-scale, the combination of a spring-scale balance, a rotary index-shaft, a coin-released locking mechanism for the shaft, a gravity device for actuating the shaft when released, the movement of which is determined by the scale mechanism, and a device for locking the shaft after rotation, released by the action of the same coin, substantially as described.

4. In a coin-operated weighing-scale, the rotary index-shaft in combination with the coin-actuated lever, $t$, normally locking said shaft; the pawl, $k$, for locking said shaft after rotation, and the coin-actuated pawl-releasing lever, $y$, arranged to operate substantially as described.

5. In a coin-operated weighing-scale, the combination of the shaft, bearing the ratchet-wheels, $q$, $i$, with the coin-actuated locking-lever, $t$, engaging wheel, $q$, the locking-pawl, $k$, adapted to engage wheel, $i$, the stop-lever, $y$, holding said pawl from engagement with said wheel, $i$, and adapted to be actuated by the same coin; and mechanism for rotating said shaft when released from said locking-lever, substantially as described.

6. In a coin-operated weighing-scale, the spring-scale balance comprising the bar, H, and its return-springs in combination with the index-shaft carrying a pinion; the gravity-rack, 20, provided with the spring-cushioned extension in position to be engaged by said bar on its return and thereby compressed whereby at a determined point in said return said rack may be actuated to reciprocate said shaft.

7. A coin-operated weighing and lifting machine comprising a dial, an index, and coin-controlled mechanism arranged to actuate said index to record the force expended in each of the two operations independently on said dial.

8. A coin-operated weighing, lifting and grip-testing machine, comprising a dial, an index and coin-controlled mechanism arranged to actuate said index to record the force expended in each of these three operations independently.

9. A coin-operated lifting and grip-testing machine comprising a dial, an index, and coin-controlled mechanism arranged to actuate said index to record the force expended in each of the two operations independently on said dial.

10. In a coin-operated weighing, lifting and grip-testing machine comprising a case provided with a single dial, and index therefor; two coin-chutes in said case; mechanism controlled by a coin in one chute for actuating the said index to record the weight applied, and by a coin in the other chute to record either the lifting or grip power applied.

11. The case, a lifting-handle, secured thereto against vertical movement, the spring-scale balance comprising the platform in combination with the index and a coin-controlled mechanism for actuating said index when said platform is depressed by the lifting strain, substantially as described.

12. The case, a grip-handle thereon, and a spring-scale balance comprising a platform in combination with an index, and a coin-controlled mechanism adapted to actuate said index to record when the grip power is applied, substantially as specified.

13. In a machine of the class described the swing-bar, 31, adapted to be actuated by the impact of a coin, a latch therefor, a sliding rack carried by said bar; an index-shaft; a pinion thereon meshing with said rack; a ratchet carried thereby, and adapted to drive said rack when moved in one direction and unlatch said swing-bar when moved in the opposite direction, substantially as described.

14. In a machine of the class described an index-shaft and coin-controlled actuating mechanism therefor, in combination with the friction-brake, 48, and its spring tensioned by connection with said shaft; the spring-scale mechanism carrying the ratchet-bar, 39, provided with a projection for engaging and releasing said brake at a determined point in the passage of said bar.

15. In a machine of the class described the coin-actuated swinging bar, 31, and the latch therefor, in combination with the sliding rack carried by said bar, and fitted to drive the index-shaft; a spring-scale mechanism, the ratchet-bar, 39, a pawl actuated to operate said latch when the bar moves in one direction, and a pallet operating said rack when the bar moves in the opposite direction.

16. In a machine of the class described the case in combination with the swinging frame, K, pivoted thereon and the levers, 24, and, 25, fitted to slide and lock in said frame.

17. In a machine of the class described the spring-tensioned grip-actuated sliding rod in combination with the index-shaft and a coin-actuated mechanism adapted to be projected into the path of said rod whereby said shaft may be rotated substantially as described.

18. In a machine of the class described, the coin-actuated swing-bar and the shaft-actuating rack carried thereby in combination with the grip-actuated sliding rod arranged to operate said rack substantially as described.

19. In a machine of the class described the coin-actuated swing-bar, 31, the shaft-actuating rack carried thereby; and a lock for said bar in combination with the grip-actuated bar, 80, adapted to operate said rack when its carriage is locked.

GEORGE G. S. MERRY.

Witnesses:
O. M. SHAW,
I. SHEUTSEF.